US012581127B2

(12) United States Patent
Li

(10) Patent No.: US 12,581,127 B2
(45) Date of Patent: Mar. 17, 2026

(54) IMAGE ENCODING METHOD, ELECTRONIC DEVICE, AND STORAGE MEDIUM

(71) Applicant: BEIJING BAIDU NETCOM SCIENCE TECHNOLOGY CO., LTD., Beijing (CN)

(72) Inventor: Xue Li, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 28 days.

(21) Appl. No.: 18/748,269

(22) Filed: Jun. 20, 2024

(65) Prior Publication Data

US 2025/0024085 A1 Jan. 16, 2025

(30) Foreign Application Priority Data

Oct. 30, 2023 (CN) .......................... 202311423667.8

(51) Int. Cl.
| | |
|---|---|
| *H04N 19/80* | (2014.01) |
| *H04N 19/119* | (2014.01) |
| *H04N 19/147* | (2014.01) |
| *H04N 19/157* | (2014.01) |
| *H04N 19/167* | (2014.01) |
| *H04N 19/176* | (2014.01) |
| *H04N 19/20* | (2014.01) |

(52) U.S. Cl.
CPC ........... *H04N 19/80* (2014.11); *H04N 19/119* (2014.11); *H04N 19/147* (2014.11); *H04N* *19/157* (2014.11); *H04N 19/167* (2014.11); *H04N 19/176* (2014.11); *H04N 19/20* (2014.11)

(58) Field of Classification Search
CPC ..... H04N 19/80; H04N 19/117; H04N 19/167
See application file for complete search history.

(56) References Cited

U.S. PATENT DOCUMENTS 7,224,852 B2 * 5/2007 Lipton ...................... G06T 7/11
382/294
8,150,155 B2 * 4/2012 El-Maleh ............. G06V 40/162
382/173

(Continued)

OTHER PUBLICATIONS

AV1 next generation video—The Constrained Directional Enhancement Filter; 2018; (Year: 2018).*

(Continued)

*Primary Examiner* — Luis Perez-Fuentes
(74) *Attorney, Agent, or Firm* — PILLSBURY WINTHROP SHAW PITTMAN, LLP

(57) ABSTRACT

A method of encoding an image, an electronic device and a storage medium are provided, which relate to a field of image processing technology, in particular to fields of image encoding, video encoding and video compression technologies. The method includes: determining a target region containing an object from an original image, where the original image includes a plurality of image blocks; filtering, for each image block, the image block according to a positional relationship between the image block and the target region to obtain a filtered image block; determining a filtered image according to the filtered image block; and encoding the filtered image according to the target region.

20 Claims, 5 Drawing Sheets

(56) References Cited

U.S. PATENT DOCUMENTS

| | | | | |
|---|---|---|---|---|
| 8,599,209 | B2 * | 12/2013 | Kameyama | H04N 7/185 |
| | | | | 345/581 |
| 10,645,383 | B2 * | 5/2020 | Zhang | H04N 19/124 |
| 10,671,855 | B2 * | 6/2020 | Lee | G06V 20/49 |
| 12,096,163 | B2 * | 9/2024 | Alm | G06V 20/52 |
| 12,143,613 | B2 * | 11/2024 | Yea | H04N 19/14 |
| 12,170,757 | B2 * | 12/2024 | Srinivasan | H04N 19/119 |

OTHER PUBLICATIONS

The AV1 constrained Directional Enhancement Filter (CDEF); 2018; (Year: 2018).*

Video Object Segmentation using Patch Seams; 2014; (Year: 2014).*

G. J. Sullivan et al, "Overview of the High Efficiency Video Coding (HEVC) Standard", IEEE Transactions on Circuits and Systems for Video Technology, vol. 22, No. 12, pp. 1649-1668 (2012).

"Series H: Audiovisual and Multimedia Systems, Infrastructure of audiovisual services—Coding of moving video, Advanced video coding for generic audiovisual services", ITU.T Rec., H.264, pp. pp. 1-262 (2003).

"Series H: Audiovisual and Multimedia Systems, Infrastructure of audiovisual services—High efficiency video coding", ITU-R, H.265, pp. 1-317 (2013).

* cited by examiner

IMAGE ENCODING METHOD, ELECTRONIC DEVICE, AND STORAGE MEDIUM

CROSS REFERENCE TO RELATED APPLICATION(S)

This application claims priority to Chinese Patent Application No. 202311423667.8, filed on Oct. 30, 2023, the content of which is incorporated herein in its entirety by reference.

TECHNICAL FIELD

The present disclosure relates to a field of image processing technology, in particular to fields of image encoding, video encoding and video compression technologies. More specifically, the present disclosure provides a method of encoding an image, an electronic device and a storage medium.

BACKGROUND

High Efficiency Video Coding (HEVC) is a new generation of video encoding and compression standard. Compared with the previous generation H.264/AVC standard, HEVC may save nearly 50% of code rate under the same clarity.

The application of HEVC in the related field of video compression is becoming increasingly widespread. However, in the practical video transcoding application, video sources come from a wide range of sources, and the quality of original videos varies. Although file storage spaces and bandwidths may be saved by directly performing HEVC transcoding on the original videos, subjective perception quality may not be greatly improved.

SUMMARY

The present disclosure provides a method of encoding an image, a device and a storage medium.

According to an aspect, a method of encoding an image is provided, including: determining a target region containing an object from an original image, where the original image includes a plurality of image blocks; filtering, for each image block, the image block according to a positional relationship between the image block and the target region to obtain a filtered image block; determining a filtered image according to the filtered image block; and encoding the filtered image according to the target region.

According to another aspect, an electronic device is provided, including: at least one processor, and a memory communicatively connected with the at least one processor; where the memory stores instructions executable by the at least one processor, and the instructions, when executed by the at least one processor, cause the at least one processor to implement the method provided according to the present disclosure.

According to another aspect, a non-transitory computer readable storage medium storing computer instructions is provided, where the computer instructions are configured to cause a computer to implement the method provided according to the present disclosure.

It should be understood that the content described in this section is not intended to identify key or important features of embodiments of the present disclosure, nor is it intended to limit the scope of the present disclosure. Other features of the present disclosure will be easily understood through the following description.

BRIEF DESCRIPTION OF THE DRAWINGS

The accompanying drawings are used to better understand this solution, which does not constitute a limitation on the present disclosure, in which.

DETAILED DESCRIPTION OF EMBODIMENTS

Exemplary embodiments of the present disclosure will be described below in conjunction with the accompanying drawings, which include various details of the embodiments of the present disclosure to facilitate understanding and should be considered as merely exemplary. Therefore, those ordinary skilled in the art should realize that various changes and modifications may be made to the embodiments described herein without departing from the scope and spirit of the present disclosure. Likewise, for clarity and conciseness, descriptions of well-known functions and structures are omitted in the following description.

Figure 1:
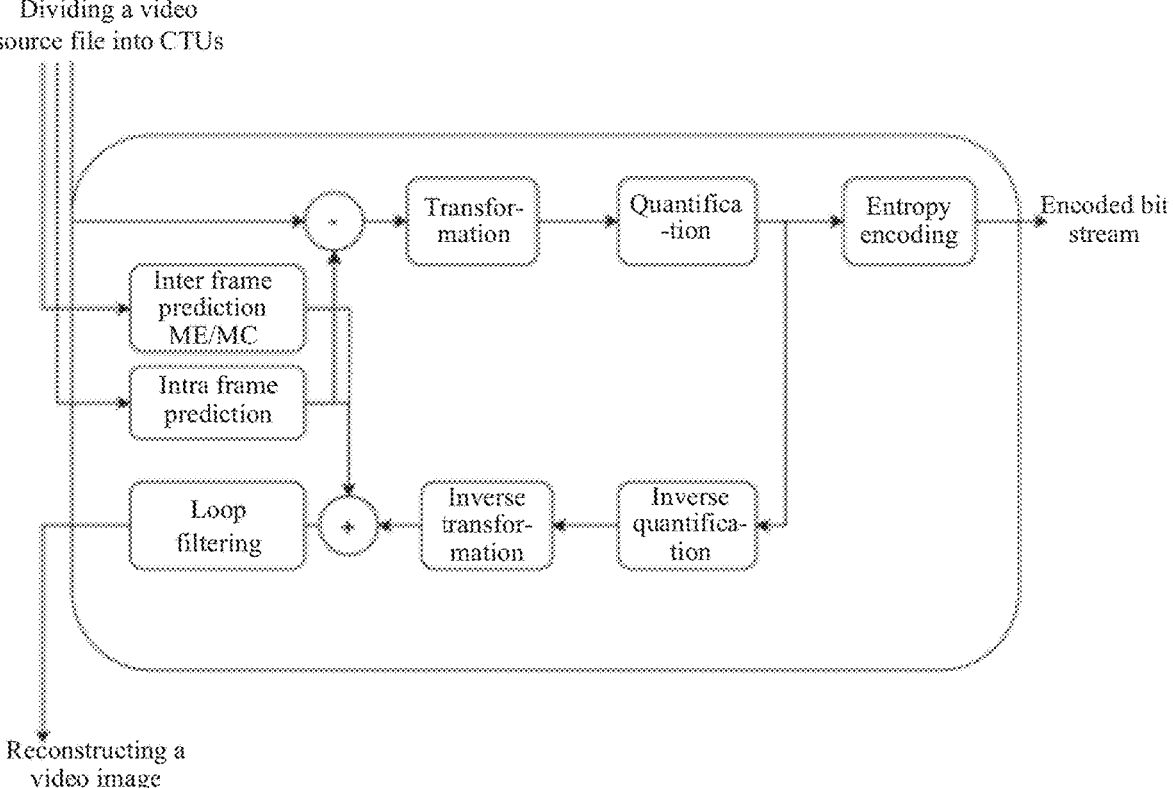
FIG. 1 is a flowchart of HEVC encoding in the related art.

FIG. 1 is a flowchart of HEVC encoding in the related art.

As shown in FIG. 1, the HEVC encoding process mainly includes: acquiring a video source file, dividing each frame of image in the video source file into several 64×64 CTUs (Coding Tree Units), sub-dividing a CTU into CUs (Coding Units), and encoding. A predictive pixel block is obtained through an intra frame prediction and an inter frame prediction, where the inter frame prediction includes a motion estimation (ME) and a motion compensation (MC). A residual block is obtained by subtracting an original pixel block from the predictive pixel block, the residual block is transformed and quantified, and then entropy encoding is performed to obtain a final encoded bit stream. Next, an inverse transformation and an inverse quantification is performed on the quantified and transformed block to obtain a decoded residual block. The decoded residual block is added to the predictive pixel block, and then de-blocking is performed (DEBLOCK), followed by loop filtering to obtain a reconstructed image, which is used as a reference image for the inter frame prediction of a next frame of image.

HEVC encoding technology is to encode based on video sources, of which the source is wide, the quality of original videos varies, and most of source videos have issues such as pseudo-shadows, block effects and unclear edges. It is impossible to improve issues such as pseudo-shadows and block effects in the video sources, and to improve the subjective perception quality of the image, by directly performing HEVC transcoding on the original videos.

In the technical solution of the present disclosure, collecting, storing, using, processing, transmitting, providing and disclosing etc. of the personal information of the user involved in the present disclosure all comply with the relevant laws and regulations, and do not violate the public order and morals.

In the technical solution of the present disclosure, the user's authorization or consent is obtained before the user's personal information is acquired or collected.

Figure 2:
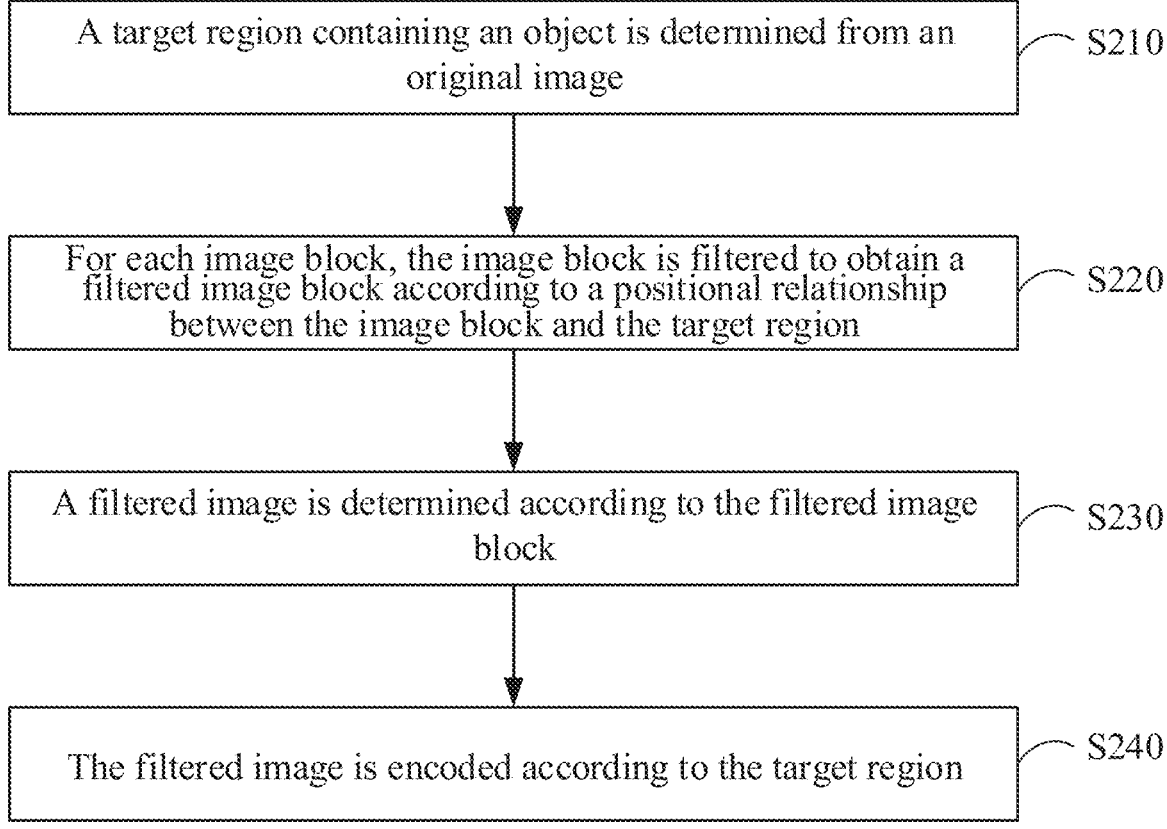
FIG. 2 is a flowchart of a method of encoding an image according to an embodiment of the present disclosure.

FIG. 2 is a flowchart of a method of encoding an image according to an embodiment of the present disclosure.

As shown in FIG. 2, the method 200 of encoding an image includes operation S210 to operation S240.

In operation S210, a target region containing an object is determined from an original image.

The original image may be an image frame from the video source file. The video source file may be obtained by decoding videos in other formats. For example, videos on various websites are encoded in various formats. If it is desired to perform more efficient encoding on these videos, for example, to perform HEVC encoding on these videos for the purpose of improving resolution and repairing images, etc., it is required to decode the video source file from these videos in other formats and operate on the video source file.

The original image contains a background and a foreground. The foreground is the region of attention, which may be objects such as faces and vehicles. These objects are recognized from the original image, and the region where these objects are located is used as a target region A region of interest (ROI) block may be used to mark the target region.

In operation S220, for each image block, the image block is filtered to obtain a filtered image block according to a positional relationship between the image block and the target region.

The original image may be divided into a plurality of image blocks. For example, a size of each image block is 32×32 pixels. In an example, the original image may be converted to YUV format, where each of Y, U and V is a pixel plane. The Y pixel plane of an original image may be divided into several 32×32 image blocks (or pixel blocks).

Next, according to the positional relationship between each image block and the target region, the image blocks may be divided into image blocks belonging to the target region and image blocks not belonging to the target region. For an image block that partially belongs to the target region, it may be directly determined as belonging to the target region; alternatively, it is possible to determine whether the image block belongs to the target region according to a proportion of overlapping region of the two. For example, if the proportion of the overlapping region is more than 50%, it may be determined that the image block belongs to the target region.

It may be understood that the target region is a relatively important region, and the image quality of the target region has a great impact on the quality of the encoded image. Therefore, different filtering strategies may be used for image blocks belonging to the target region and image blocks not belonging to the target region.

For example, for image blocks belonging to the target region, the image quality has a great impact on subjective perception. Therefore, corresponding filtering strategies may be used to filter out pseudo-shadows, block effects, etc. For image blocks not belonging to the target region, the impact of the image quality on subjective perception is relatively small. It may be further determined whether there are problems such as unclear edges in the image blocks. If so, a corresponding filtering strategy may be used to improve the clarity.

The filtering strategy may use a constrained directional enhancement filtering method. For the image blocks belonging to the target region and the image blocks not belonging to the target region but have unclear edges, different degrees of filtering may be performed respectively.

In operation S230, a filtered image is determined according to the filtered image block.

Each 32×32 image block is filtered to obtain a filtered image block. The plurality of 32×32 image blocks in the original image are filtered by different filtering strategies to obtain the filtered image.

It may be understood that the filtered image is obtained before HEVC encoding by pre-processing the original image for the HEVC encoding. Pre-processing includes operation S210 to operation S230 mentioned above. The pre-processed filtered image reduces pseudo-shadows, block effects and unclear edges in the original image, resulting in a filtered image with better quality for subsequent encoding.

In operation S240, the filtered image is encoded according to the target region.

For the filtered image, HEVC encoding may be performed to further obtain a smoother and clearer encoded image.

In the process of HEVC encoding, the filtered image is divided into a plurality of coding units. According to different division modes, there are coding units of various granularity sizes. For example, the filtered image is first divided into several 64×64 coding tree units CTUs. Then, a CTU is further sub-divided into coding units CUs, and the coding unit CU is then further sub-divided into sub-CUs, and so on, so as to obtain a plurality of levels of images.

For example, each CTU at a first level is divided into four 32×32 CUs, each 32×32 CU at a second level is divided into four 16×16 sub-CUs, each 16×16 sub-CU at a third level is divided into four 8×8 sub-CUs in the next level, and so on. The CU at the current level is a sub-CU for the previous level.

Next, a rate distortion cost of the CU at each level and a rate distortion cost of the sub-CU at the next level are calculated respectively. The CU (or sub-CU) division method with a minimum rate distortion cost is selected as a final target division method. The encoded image generated by encoding the CU under this target division method is the image encoded by HEVC.

It may be understood that in the above encoding process, a more refined division will cause the encoding effect to be better. However, due to consideration of the rate distortion cost, it is required to compare the rate distortion cost of the CU at the current level and the rate distortion cost of the sub-CU at the next level, and select a division method with lower cost as the final target division method, which may balance the encoding effect and the encoding costs.

Considering that the target region is the region of interest, when selecting the target division method, the encoding effect of the target region may be improved by adjusting encoding parameters for the target region.

For example, when comparing the rate distortion cost between the CU at the current level and the sub-CU at the next level, a weight (this weight is less than 1) may be added to the rate distortion cost of the sub-CU, so that the selection strategy tends to select a more refined division method, so as to further improve the encoding effect of the target region.

In the embodiments of the present disclosure, the image block is filtered based on the positional relationship between the image block and the target region before HEVC encoding, so that the image block belonging to the target region and the image block not belonging to the target region use corresponding filtering methods respectively, which may improve the image quality of the original image. In the HEVC encoding process, parameters of HEVC encoding are adjusted according to the target region, thereby further improving the encoding effect and obtaining the encoded image with higher quality.

According to the embodiments of the present disclosure, the operation S220 includes determining a filtering cost of the image block in each direction among N directions according to a pixel difference of the image block in each direction, where N is an integer greater than 1; determining a main filtering direction and an auxiliary filtering direction according to the filtering cost; and filtering the image block according to the main filtering direction, the auxiliary filtering direction and the positional relationship between the image block and the target region, so as to obtain a filtered image block.

For example, the filtering strategy may use constrained directional enhancement filtering, which defines N (e.g. 8) directions. The filtering cost is calculated on the image block in N directions, and a direction with a minimum filtering cost is searched from the N directions, so as to perform filtering.

It should be noted that for filtering the image block, the image block may be divided into image blocks with finer granularities. For example, if a size of each image block is 32×32, each 32×32 image block may be divided into sixteen 8×8 image blocks. The filtering direction is determined for the 8×8 image block.

According to the embodiments of the present disclosure, the determining a filtering cost of the image block in each direction includes: for each direction, calculating an average value of pixels for each row in the direction, and determining a filtering cost of each row according to a difference between the average value and each pixel in the row; and determining the filtering cost of the image block in the direction according to respective filtering cost of each row of the at least one row of pixels.

Figure 3:
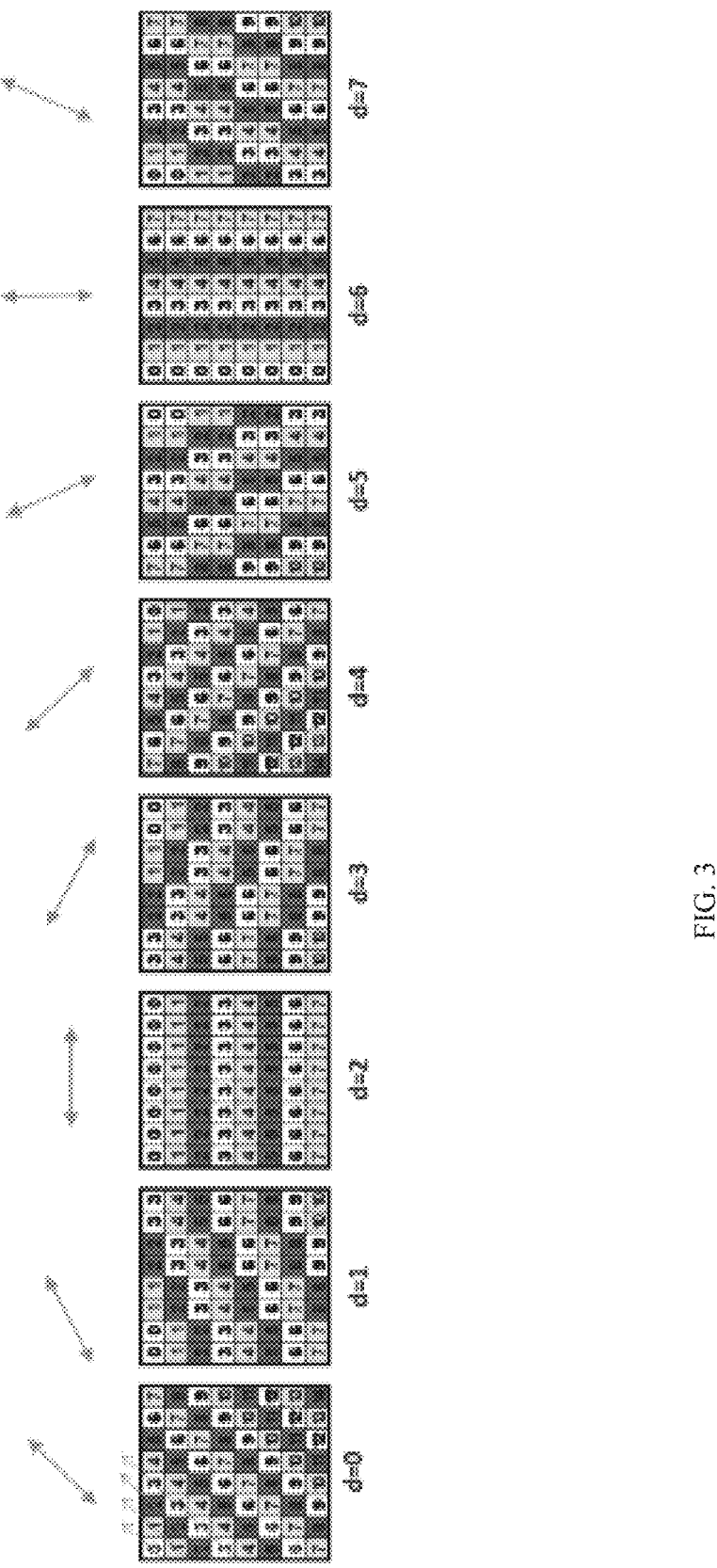
FIG. 3 is a schematic diagram of determining filtering costs of an image block in N directions according to an embodiment of the present disclosure.

FIG. 3 is a schematic diagram of determining a filtering cost of an image block in N directions according to an embodiment of the present disclosure.

As shown in FIG. 3, the size of the image block is 8×8. For each direction d (d=0, 1, . . . , N−1) among the N directions, the image block includes a plurality of rows (or columns) in this direction. For example, eight rows (0 to 7) pixels are included in a direction of d=2, and eight columns (0 to 7) pixels are included in a direction of d=6. In other directions, there are no conventional rows and columns. For ease of description, for each direction, pixels in this direction are referred to as a row, and pixels in a direction perpendicular to this direction are referred to as a column. For example, in a direction of d=0, the direction indicated by the arrow is a row.

For each direction d among the N directions, the average value of pixels for each row in this direction may be calculated, pixels of each pixel point of this row is replaced with the average value, and a difference between the replaced pixel block and an original pixel block is calculated as the filtering cost (cost [d]). The calculation equation of the cost [d] is shown as the following equation (1).

$$\text{cost}[d] = \sum_{k} \sum_{p \in P_{d,k}} (x_p - \mu_{d,k})^2 \qquad (1)$$

where d represents a direction, $x_p$ represents an original pixel value, $\mu_{d,k}$ represents an average value, k represents a number of columns, $P_{d,k}$ represents a range of the pixel points.

It should be noted that each pixel point in one row is located in different columns. This equation (1) constrains a range of each pixel point in the column. Therefore, a filtering cost of each column is calculated first, and then a sum of the filtering costs of all columns is calculated as the filtering cost in this direction. This is consistent with a calculation method of first calculating the filtering cost for each row, and then calculating the filtering cost of all rows.

After obtaining the filtering cost (cost [d]) in all directions of d=0, 1, . . . , N−1, the direction with the minimum filtering cost (cost [d]) is determined as a main filtering direction d_main. Then, two directions which tilt at an angle of 45 degrees with respect to two sides of the main filtering direction are determined as an auxiliary filtering direction d_aux.

For example, if the main filtering direction is d_main=2, the auxiliary filtering directions are d_aux=0 and d_aux=4. If the main filtering direction is d_main=6, the auxiliary filtering directions are d_aux=4 and d_aux=0.

It should be noted that during HEVC encoding, filtering operation is included. However, the filtering operation in the HEVC encoding is to filter out blocking effect in a decoding stage. This embodiment creatively determines the main filtering direction and the auxiliary filtering direction based on the constrained directional enhancement filtering method before HEVC encoding, which is used to perform filtering pre-processing on the original image, so that it is possible to improve the quality of the original image, thereby causing the image quality to be better after HEVC encoding.

According to the embodiments of the present disclosure, after obtaining the main filtering direction and the auxiliary filtering direction, filtering the image block includes: filtering the image block in the main filtering direction and the auxiliary filtering direction respectively, in response to the image block belonging to the target region; determining an edge attribute of the image block, and filtering the image block in the main filtering direction and the auxiliary filtering direction respectively according to the edge attribute, in response to the image block not belonging to the target region.

For example, for the image block belonging to the target region, a primary filtering may be performed in the main filtering direction, and then a secondary filtering may be performed in the auxiliary filtering direction, so as to obtain the filtered image block. For example, filtering of five pixel points may be performed in the main filtering direction, and the filtering of five pixel points may also be performed in the auxiliary filtering direction.

For the image block not belonging to the target region, it is possible to further distinguish whether the image block belongs to a strong edge region. If the image block is a strong edge region, the image block will be filtered. Otherwise, the image block will not be filtered. For example, for the image block in the strong edge region, filtering of five pixel points may be performed in the main filtering direction, and filtering of three pixel points may also be performed in the auxiliary filtering direction.

In an example, if an 8×8 image block does not belong to the target region, constrained directional enhancement filtering may be adaptively performed according to whether the 8×8 image block belongs to a strong edge region. If the 8×8 image block is a strong edge region, constrained directional enhancement filtering may be performed on the 32×32 image block where the 8×8 image block is located, the filtering of five pixel points may be performed in the main filtering direction, and the filtering of three pixel points may be performed in the auxiliary filtering direction. If there are no strong edge regions within the 32×32 image block, filtering operation will not be performed in the 32×32 pixel block.

This embodiment adaptively performs constrained directional enhancement filtering on the image block in the target region and the image block in the non-target region based on the positional relationship between the image block and the target region, thereby improving the quality of the original image and obtaining smoother and clearer filtered image for subsequent HEVC encoding.

According to the embodiments of the present disclosure, for the image block not belonging to the target region, determining the edge attribute of the image block includes: determining a direction perpendicular to the main filtering direction as a vertical filtering direction; determining a ratio of the filtering cost in the main filtering direction to the filtering cost in the vertical filtering direction; and determining the edge attribute of the image block being the strong edge region in response to the ratio being greater than a threshold.

The direction perpendicular to the main filtering direction d_main is determined as the vertical filtering direction d_vert.

For example, if the main filtering direction is d_main=0, the vertical filtering direction is d_vert=4. If the main filtering direction is d_main=2, the auxiliary filtering direction is d_aux=6.

For the image block not belonging to the target region, the size of the image block is, for example, 8×8. The greater the difference between the filtering cost (cost [d_vert]) of the image block in the vertical filtering direction and the filtering cost (cost [d_main]) of the image block in the main filtering direction, the greater the probability that the pixel block is a strong edge region.

For example, the ratio (RATIO) of the filtering cost (cost[d_vert]) in the vertical filtering direction to the filtering cost in the main filtering direction may be calculated, and a threshold T1 (e.g. 10) may be set. If the ratio (RATIO) is greater than the threshold T1, it may be determined that the image block is a strong edge region.

For the image block not belonging to the target region, this embodiment further distinguishes whether the image block belongs to a strong edge region. For the image block belonging to the strong edge region, constrained directional enhancement filtering may be adaptively performed, which may improve the clarity of the edge region of the original image and improve the quality of the image.

According to the embodiments of the present disclosure, the operation S240 includes dividing the filtered image according to M division modes to obtain M levels of images, where the M levels of images contain encoding units having different granularities and different numbers in different levels, division granularities of the M division modes decrease sequentially, each encoding unit in an $i^{th}$-level image is divided into n sub-encoding units by an $(i+1)^{th}$ division mode, M is an integer greater than 1, i is an integer greater than 1 and less than or equal to M, and n is an integer greater than 1; determining a rate distortion cost generated after encoding and reconstructing the encoding unit, as a first rate distortion cost, in a division mode with the encoding unit as a granularity; determining a sum of rate distortion costs generated by encoding and reconstructing n sub-encoding units respectively, as a second rate distortion cost, in a division mode with the sub-encoding unit as a granularity; determining one of the division mode with the encoding unit as a granularity and the division mode with the sub-encoding unit as a granularity as a target division mode, according to a positional relationship between the encoding unit and the target region, the first rate distortion cost and the second rate distortion cost; and determining an encoded image according to a target encoding unit in the target division mode.

In a process of encoding the filtered image, a plurality of levels of images may be obtained according to a plurality of division modes. For example, the filtered image is divided into several 64×64 coding tree units (CTUs) to obtain a first level image. Each CTU in the first level image is divided into four 32×32 CUs to obtain a second level image. Each 32×32 CU in the second level image is divided into four 16×16 sub-CUs to obtain a third level image. Each 16×16 sub-CU in the third level image is divided into four 8×8 sub-CUs in the next level, and so on.

Next, the rate distortion cost of the CU at each level and the rate distortion cost of the sub CU at the next level are calculated respectively. For example, for a CU at a certain level, a predicted pixel block is obtained through an intra frame prediction and an inter frame prediction, a residual block is obtained by subtracting an original pixel block (i.e., the CU) from the predictive pixel block, and the residual block is transformed, quantified and entropy encoded, so as to obtain encoding bits (BITS). Then decoding is performed to obtain a reconstructed image. The decoding process includes performing inverse transformation and inverse quantification on the quantified and transformed block to obtain a decoded residual block, adding the decoded residual block to the predicted pixel block, and then performing de-blocking, filtering and other operations, so as to obtain a reconstructed image. Then, the difference between the filtered image and the reconstructed image is calculated, and the difference is, for example, a sum of squared errors (SSE). Then, the rate distortion cost (RDCOSTS_CURR) of the current CU is calculated according to the encoding bits (BITS) and the difference between the filtered image and the reconstructed image, as the first rate distortion cost. The first rate distortion cost (RDCOSTS_CURR) may be calculated by the following equation (2).

$$RDCOSTS\_CURR = SSE + LAMBDA * BITS \qquad (2)$$

where SSE represents a sum of squared errors between the filtered image and the reconstructed image, BITS is encoding bits, and LAMBDA is a coefficient obtained through looking up a table.

Next, for the sub-CUs included in the aforementioned CU, for example, including four sub-CUs. Similar to calculating the rate distortion cost of CU, the sum of the rate distortion costs of the four sub-CUs is calculated as the second rate distortion cost. Then, it is determined whether the current CU contains the target region pixels, or whether the current CU belongs to the ROI region. If so, a weight is assigned to the second rate distortion cost. The weighted second rate distortion cost (RDCOSTS_CHILDER) may be represented by the following equation (3).

$$RDCOSTS\_CHILDER = second\ rate\ distortion\ cost * T2 \qquad (3)$$

where T2 is a weight assigned for the second rate distortion cost. If the current CU contains the target region pixels, or in a case that the current CU belongs to the target region, 0<T2<1, for example, T2=0.9. A sub-CU division method is tended to be selected. In a case that the current CU does not contain the target region pixels or does not belong to the target region, T2=1, that is, no weight is assigned to the division method of the sub-CUs. The selection of division method is determined according to practical rate distortion costs of the CU and the sub-CUs.

According to the embodiments of the present disclosure, the target division mode is determined according to the minimum rate distortion cost between the first rate distortion cost and the weighted second rate distortion cost.

For example, by comparing the first rate distortion cost and the weighted second rate distortion cost, if the first rate distortion cost is smaller than the weighted second rate distortion cost, the current CU division method is determined as the target division mode. Conversely, a sub-CU division method of the current CU is the target division mode.

According to the steps of determining the target division mode above, the CU of each layer is traversed to compare the rate distortion cost with the sub-CUs, so as to determine a final target division mode. The encoding of the CU or the sub-CU in the target division mode is determined to be an optimal encoding, and the encoded image obtained by this optimal encoding is the image obtained by HEVC encoding.

The embodiment of the present disclosure adjusts the parameters of HEVC encoding according to the target region during the HEVC encoding process, such as adjusting the weight of the rate distortion cost of the sub-CU, which may balance the rate distortion cost and the encoding effect.

Figure 4:
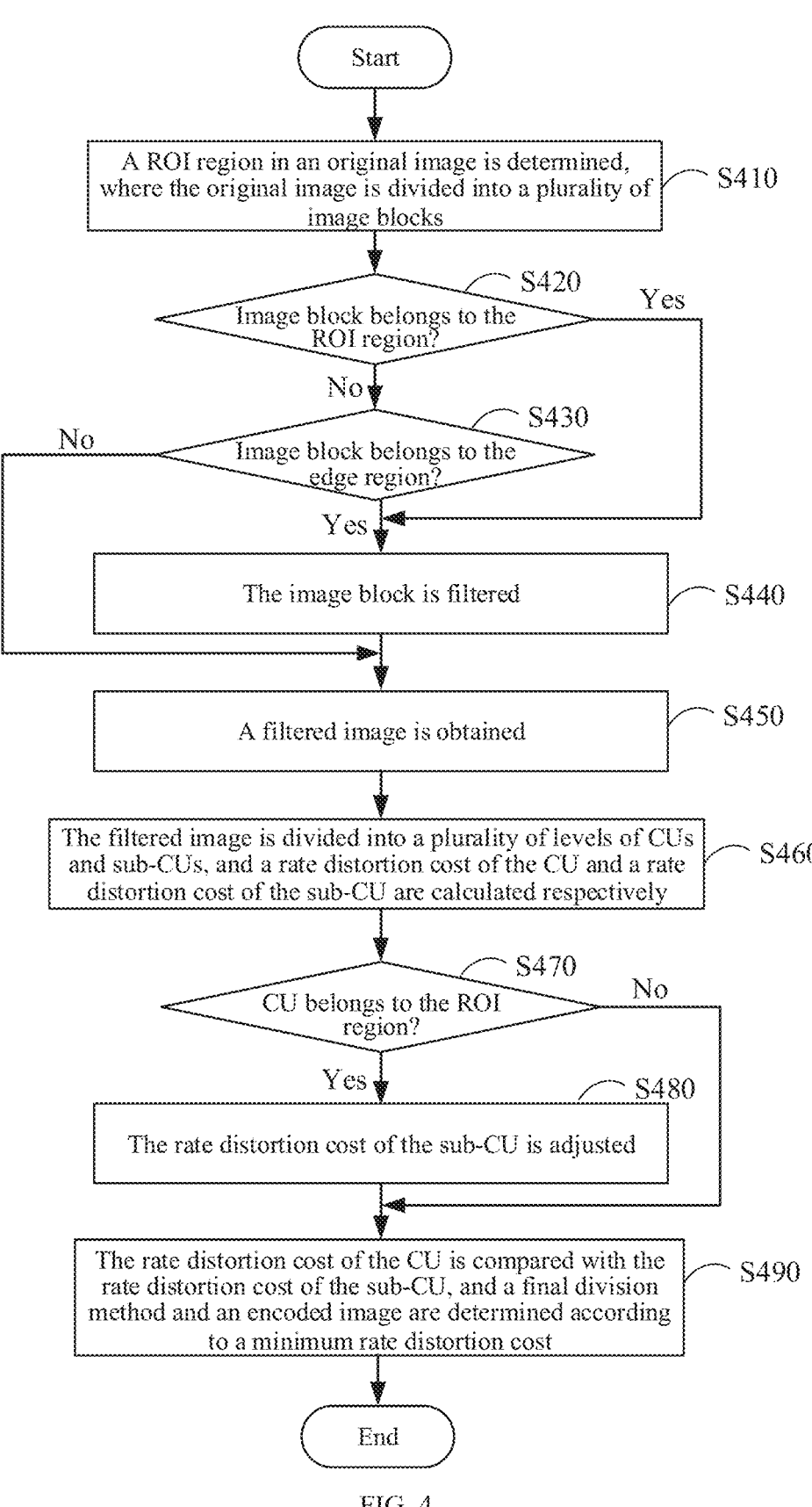
FIG. 4 is a flowchart of a method of encoding an image according to an embodiment of the present disclosure.

FIG. 4 is a flowchart of a method of encoding an image according to another embodiment of the present disclosure.

As shown in FIG. 4, the method of encoding an image includes operation S410 to operation S490.

In operation S410, a ROI region in an original image is determined, where the original image is divided into a plurality of image blocks.

The operation 410 is similar to the operation S210, where the ROI region is the target region, which will not be repeated here.

In operation S420, for each image block, it is determined whether this image block belongs to the ROI region. If so, operation S440 is implemented; otherwise, operation S430 is implemented.

For example, if the image block belongs to the ROI region, the image quality of the image block has a great impact on the encoded image quality. For this type of image block, operation S440 is performed for filtering, where the filtering may use constrained directional enhancement filtering. For the image blocks not belonging to the ROI region, operation S30 is performed to further determine whether these image blocks belong to an edge region.

In operation S430, it is determined whether the image block belongs to an edge region. If so, operation S440 is implemented; otherwise, operation S450 is implemented.

For example, whether the image block belongs to an edge region may be determined based on an edge detection technology. It may also be determined based on a difference between the filtering cost of the image block in the main filtering direction and the filtering cost of the image block in the vertical filtering direction. The greater the difference between the filtering costs in the two directions, the greater the probability that the image block belongs to the edge region.

For example, a ratio of the filtering cost in the vertical direction to the filtering cost in the main filtering direction may be calculated. If the ratio is greater than the threshold T1 (e.g. 10), it may be determined that the image block belongs to the edge region.

In operation S440, the image block is filtered.

The filtering method may use constrained directional enhancement filtering, and the image block to be filtered includes an image block belonging to the ROI region and an image block belonging to the edge region but not belonging to the ROI region. For the ROI region and the non-ROI region, different filtering strategies may be used to adaptively perform constrained directional enhancement filtering.

For example, for the image block in the ROI region, the filtering of five pixel points is performed in the main filtering direction and the filtering of five pixel points is performed in the auxiliary filtering direction. For the image block not belonging to the ROI region but belonging to the edge region, the filtering of five pixel points is performed in the main filtering direction, and the filtering of three pixel points is performed in the auxiliary filtering direction.

In operation S450, a filtered image is obtained.

The filtered image blocks and the unfiltered image blocks in the non-ROI region and non-edge region, form the filtered image.

In operation S460, the filtered image is divided into a plurality of levels of CUs and sub-CUs, and a rate distortion cost of the CU and a rate distortion cost of the sub-CUs are calculated respectively.

The rate distortion cost of the CU may be with reference to the equation (2) described above, and the rate distortion cost of the sub-CUs may be with reference to the equation (3) described above, which will not be repeated here.

In operation S470, it is determined whether the current CU belongs to the ROI region. If so, operation S480 is implemented; otherwise, operation S490 is implemented.

In operation S480, the rate distortion cost of the sub-CUs is adjusted.

In operation S490, the rate distortion cost of the CU is compared with the rate distortion cost of the sub-CUs, and a final division method and an encoded image are determined according to a minimum rate distortion cost.

For example, if the current CU belongs to the ROI region, a weight less than 1 may be assigned to the rate distortion cost of the sub-CUs, so that the rate distortion cost of the sub-CUs is relatively small. Therefore, when determining the minimum value from the rate distortion cost of the CU and the rate distortion cost of the sub-CUs, it is tended to select the sub-CUs, and thus it is tended to select the division mode of the sub-CUs. Finally, the encoded image may be determined according to the determined final division method, which achieves a balance between precision and costs.

Figure 5:
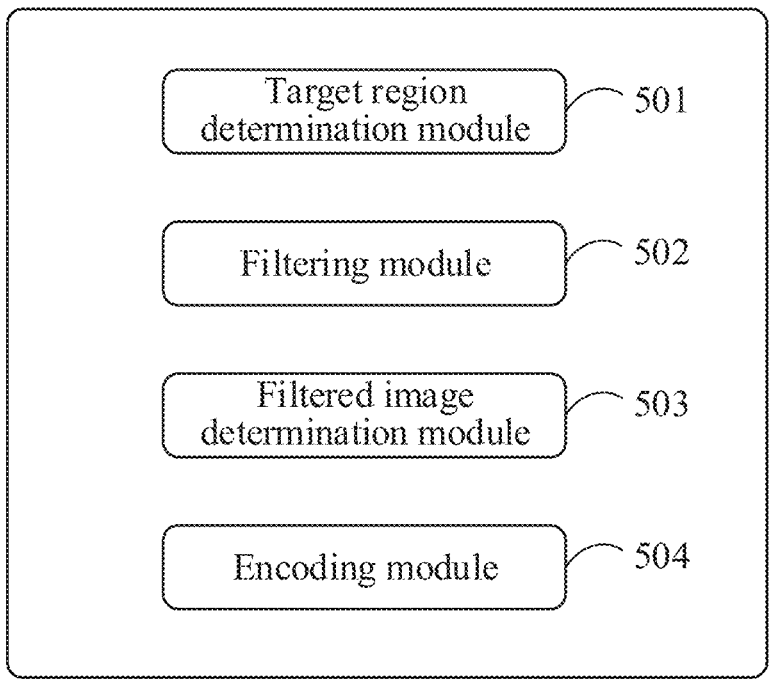
FIG. 5 is a block diagram of an apparatus of encoding an image according to an embodiment of the present disclosure.

FIG. 5 is a block diagram of an apparatus of encoding an image according to an embodiment of the present disclosure.

As shown in FIG. 5, the apparatus 500 of encoding an image includes a target region determination module 501, a filtering module 502, a filtered image determination module 503 and an encoding module 504.

The target region determination module 501 is used to determine a target region containing an object from an original image, where the original image includes a plurality of image blocks.

The filtering module 502 is used for each image block to filter the image block according to a positional relationship between the image block and the target region to obtain a filtered image block.

The filtered image determination module 503 is used to determine a filtered image according to the filtered image block.

The encoding module 504 is used to encode the filtered image according to the target region.

The filtering module 502 includes a filtering cost determination sub-module, a filtering direction determination sub-module, and a filtering sub-module.

The filtering cost determination sub-module is used for each image to determine a filtering cost of the image block in each direction among N directions according to a pixel difference of the image block in each direction, where N is an integer greater than 1.

The filtering direction determination sub-module is used to determine a main filtering direction and an auxiliary filtering direction according to the filtering cost.

The filtering sub-module is used to filter the image block according to the main filtering direction, the auxiliary filtering direction and the positional relationship between the image block and the target region.

The filtering direction determination sub-module includes a main filtering direction determination unit and an auxiliary filtering direction determination unit.

The main filtering direction determination unit is used to determine a direction with a minimum filtering cost as the main filtering direction.

The auxiliary filtering direction determination unit is used to determine two directions which tilt at an angle of 45 degrees with respect to two sides of the main filtering direction as the auxiliary filtering direction.

The filtering sub-module includes a first filtering unit and a second filtering unit.

The first filtering unit is used to filter the image block in the main filtering direction and the auxiliary filtering direction respectively to obtain the filtered image block, in response to the image block belonging to the target region.

The second filtering unit is used to determine an edge attribute of the image block in response to the image block not belonging to the target region, and filter the image block in the main filtering direction and the auxiliary filtering direction respectively to obtain the filtered image block according to the edge attribute.

The second filtering unit includes a vertical filtering direction determination sub-unit, an edge attribute determination sub-unit, and a filtering sub-unit.

The vertical filtering direction determination sub-unit is used to determine a direction perpendicular to the main filtering direction as a vertical filtering direction.

The edge attribute determination sub-unit is used to determine the edge attribute of the image block according to a filtering cost in the main filtering direction and a filtering cost in the vertical filtering direction.

The filtering sub-unit is used to filter the image block in the main filtering direction and the auxiliary filtering direction respectively, in response to the edge attribute of the image block being a strong edge region.

The edge attribute determination sub-unit is used to determine a ratio of the filtering cost in the main filtering direction to the filtering cost in the vertical filtering direction; and determine the edge attribute of the image block being the strong edge region, in response to the ratio being greater than a threshold.

The first filtering unit and/or the second filtering unit are/is used to perform a primary filtering on the image block in the main filtering direction to obtain a primary filtered image block; and perform a secondary filtering on the primary filtered image block in the auxiliary filtering direction to obtain the filtered image block.

According to the embodiments of the present disclosure, the image block includes at least one row of pixels in each direction. The filtering cost determination sub-module is used for each direction to calculate an average value of pixels for each row in the direction, determine a filtering cost of each row according to a difference between the average value and each pixel in the row; and determine the filtering cost of the image block in the direction according to respective filtering cost of each row of the at least one row of pixels.

The encoding module 504 includes a division sub-module, a first rate distortion cost determination sub-module, a second rate distortion cost determination sub-module, a target division mode determination sub-module, and an encoded image determination sub-module.

The division sub-module is used to divide the filtered image according to M division modes to obtain M levels of images. The M levels of images contain encoding units having different granularities and different numbers in different levels. Division granularities of the M division modes decrease sequentially. Each encoding unit in an $i^{th}$-level image is divided into n sub-encoding units by an $(i+1)^{th}$ division mode. M is an integer greater than 1, i is an integer greater than 1 and less than or equal to M, and n is an integer greater than 1.

The first rate distortion cost determination sub-module is used to determine a rate distortion cost generated after encoding and reconstructing the encoding unit as a first rate distortion cost, in a division mode with the encoding unit as a granularity.

The second rate distortion cost determination sub-module is used to determine a sum of rate distortion costs generated by encoding and reconstructing n sub-encoding units respectively as a second rate distortion cost, in a division mode with the sub-encoding unit as a granularity.

The target division mode determination sub-module is used to determine one of the division mode with the encoding unit as a granularity and the division mode with the sub-encoding unit as a granularity as a target division mode, according to a positional relationship between the encoding unit and the target region, the first rate distortion cost and the second rate distortion cost.

The encoded image determination sub-module is used to determine an encoded image according to a target encoding unit in the target division mode.

The target division mode determination sub-module is used to weight the second rate distortion cost to obtain a weighted second rate distortion cost, in response to the encoding unit belonging to the target region; determine the target division mode according to a minimum rate distortion cost between the first rate distortion cost and the weighted second rate distortion cost.

According to the embodiments of the present disclosure, the present disclosure also provides an electronic device, a readable storage medium and a computer program product.

Figure 6:
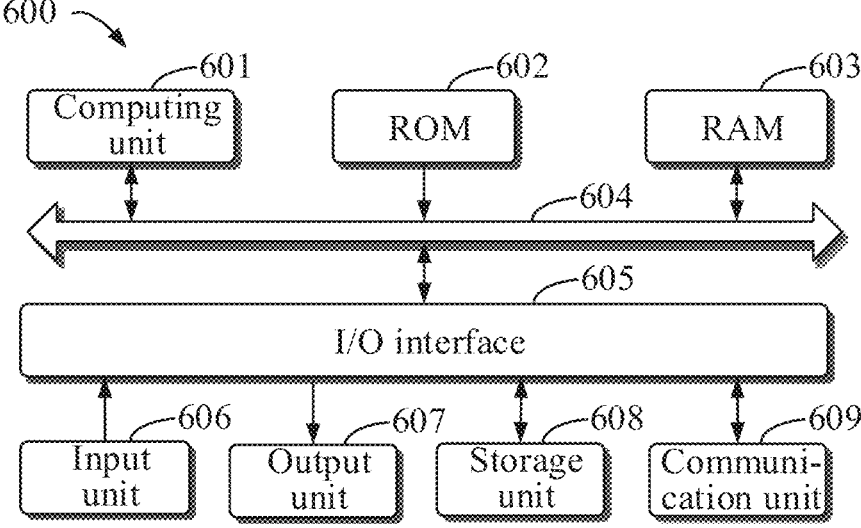
FIG. 6 is a block diagram of an electronic device for implementing a method of encoding an image according to an embodiment of the present disclosure.

FIG. 6 shows a schematic block diagram of an example electronic device 600 that may be used to implement the embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 6, the electronic device 600 may include a computing unit 601, which may perform various appropriate actions and processes based on a computer program stored in a read-only memory (ROM) 602 or a computer program loaded from a storage unit 608 into a random access memory (RAM) 603. Various programs and data required for the operation of the electronic device 600 may be stored in the RAM 603. The computing unit 601, the ROM 602, and the RAM 603 are connected to each other through a bus 604. An input/output (I/O) interface 605 is further connected to the bus 604.

Various components in the electronic device 600 are connected to the I/O interface 605, including: an input unit 606, such as a keyboard, a mouse, etc.; an output unit 607, such as various types of displays, speakers, etc.; a storage unit 608, such as a magnetic disk, an optical disk, etc.; and a communication unit 609, such as a network card, a modem, a wireless communication transceiver, etc. The communication unit 609 allows the electronic device 600 to exchange information/data with other devices through a computer network such as the Internet and/or various telecommunications networks.

The computing unit 601 may be various general-purpose and/or special-purpose processing components with processing and computing capabilities. Some examples of computing unit 601 include but are not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, and so on. The computing unit 601 may perform the various methods and processes described above, such as the method of encoding the image. For example, in some embodiments, the method of encoding the image may be implemented as a computer software program that is tangibly contained on a machine-readable medium, such as a storage unit 608. In some embodiments, part or all of a computer program may be loaded and/or installed on the electronic device 600 via the ROM 602 and/or the communication unit 609. When the computer program is loaded into the RAM 603 and executed by the computing unit 601, one or more steps of the method of encoding the image described above may be performed. Alternatively, in other embodiments, the computing unit 601 may be configured to perform the method of encoding the image in any other appropriate ways (for example, by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

Program codes for implementing the method of the present disclosure may be written in any combination of one or more programming languages. These program codes may be provided to a processor or a controller of a general-purpose computer, a special-purpose computer, or other programmable data processing devices, so that when the program codes are executed by the processor or the controller, the functions/operations specified in the flowchart and/or block diagram may be implemented. The program codes may be executed completely on the machine, partly on the machine, partly on the machine and partly on the remote machine as an independent software package, or completely on the remote machine or the server.

In the context of the present disclosure, the machine readable medium may be a tangible medium that may contain or store programs for use by or in combination with an instruction execution system, device or apparatus. The machine readable medium may be a machine-readable signal medium or a machine-readable storage medium. The machine readable medium may include, but not be limited to, electronic, magnetic, optical, electromagnetic, infrared or semiconductor systems, devices or apparatuses, or any suitable combination of the above. More specific examples of the machine readable storage medium may include electrical connections based on one or more wires, portable computer disks, hard disks, random access memory (RAM), read-only memory (ROM), erasable programmable read-only memory (EPROM or flash memory), optical fiber, convenient compact disk read-only memory (CD-ROM), optical storage device, magnetic storage device, or any suitable combination of the above.

In order to provide interaction with users, the systems and techniques described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and Internet.

The computer system may include a client and a server. The client and the server are generally far away from each other and usually interact through a communication network. The relationship between the client and the server is generated through computer programs running on the corresponding computers and having a client-server relationship with each other.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of encoding an image, the method comprising:

determining a target region containing an object from an original image, wherein the original image comprises a plurality of image blocks;

filtering, for each image block, the image block according to a positional relationship between the image block and the target region to obtain a filtered image block, wherein at least two positional relationships exist between the plurality of image blocks and the target region, and different positional relationships correspond to different filtering strategies;

determining a filtered image according to a plurality of the filtered image blocks obtained by filtering the plurality of image blocks by the different filtering strategies; and encoding the filtered image according to the target region, wherein the encoding comprises:

dividing the filtered image according to M division modes to obtain M levels of images, wherein the M levels of images contain encoding units having different granularities and different numbers in different levels, division granularities of the M division modes decrease sequentially, each encoding unit in an $i^{th}$-level image is divided into n sub-encoding units by an $(i+1)^{th}$ division mode, M is an integer greater than 1, i is an integer greater than 1 and less than or equal to M, and n is an integer greater than 1;

determining, in a division mode with the encoding unit as a granularity, a rate distortion cost generated after encoding and reconstructing the encoding unit, as a first rate distortion cost;

determining, in a division mode with the sub-encoding unit as a granularity, a sum of rate distortion costs generated by encoding and reconstructing n sub-encoding units respectively, as a second rate distortion cost;

determining the division mode with the encoding unit as a granularity or the division mode with the sub-encoding unit as a granularity as a target division mode, according to a positional relationship between the encoding unit and the target region, the first rate distortion cost and the second rate distortion cost; and determining an encoded image according to a target encoding unit in the target division mode.

2. The method of claim 1, wherein filtering the image block according to the positional relationship between the image block and the target region comprises: for each image block, determining a filtering cost of the image block in each direction among N directions according to a pixel difference of the image block in each direction, where N is an integer greater than 1;

determining a main filtering direction and an auxiliary filtering direction according to the filtering cost; and filtering the image block according to the main filtering direction, the auxiliary filtering direction and the positional relationship between the image block and the target region.

3. The method of claim 2, wherein the determining a main filtering direction and an auxiliary filtering direction according to the filtering cost comprises:

determining a direction with a minimum filtering cost as the main filtering direction; and determining two directions which tilt at an angle of 45 degrees with respect to two sides of the main filtering direction as the auxiliary filtering direction.

4. The method of claim 2, wherein the filtering the image block according to the main filtering direction, the auxiliary filtering direction and the positional relationship between the image block and the target region comprises:

filtering, in response to the image block belonging to the target region, the image block in the main filtering direction and the auxiliary filtering direction respectively; and determining, in response to the image block not belonging to the target region, an edge attribute of the image block, and filtering the image block in the main filtering direction and the auxiliary filtering direction respectively according to the edge attribute.

5. The method of claim 4, wherein determining the edge attribute of the image block, and filtering the image block in the main filtering direction and the auxiliary filtering direction respectively according to the edge attribute comprises:

determining a direction perpendicular to the main filtering direction as a vertical filtering direction;

determining the edge attribute of the image block according to a filtering cost in the main filtering direction and a filtering cost in the vertical filtering direction; and filtering, in response to the edge attribute of the image block being a strong edge region, the image block in the main filtering direction and the auxiliary filtering direction respectively.

6. The method of claim 5, wherein the determining the edge attribute of the image block according to a filtering cost in the main filtering direction and a filtering cost in the vertical filtering direction comprises:

determining a ratio of the filtering cost in the main filtering direction to the filtering cost in the vertical filtering direction; and determining, in response to the ratio being greater than a threshold, the edge attribute of the image block being the strong edge region.

7. The method of claim 4, wherein filtering the image block in the main filtering direction and the auxiliary filtering direction respectively comprises:

performing a primary filtering on the image block in the main filtering direction to obtain a primary filtered image block; and performing a secondary filtering on the primary filtered image block in the auxiliary filtering direction to obtain the filtered image block.

8. The method of claim 2, wherein the image block comprises at least one row of pixels in each direction; and the determining a filtering cost of the image block in each direction among N directions according to a pixel difference of the image block in each direction comprises: for each direction, calculating an average value of pixels for each row in the direction, and determining a filtering cost of each row according to a difference between the average value and each pixel in the row; and determining the filtering cost of the image block in the direction according to respective filtering cost of each row of the at least one row of pixels.

9. The method of claim 1, wherein the determining one of the division mode with the encoding unit as a granularity and the division mode with the sub-encoding unit as a granularity as a target division mode, according to a positional relationship between the encoding unit and the target region, the first rate distortion cost and the second rate distortion cost comprises:

weighting, in response to the encoding unit belonging to the target region, the second rate distortion cost to obtain a weighted second rate distortion cost; and determining the target division mode according to a minimum rate distortion cost between the first rate distortion cost and the weighted second rate distortion cost.

10. An electronic device comprising:

at least one processor; and a memory communicatively connected with the at least one processor;

wherein the memory stores instructions executable by the at least one processor, and the instructions, when executed by the at least one processor, cause the at least one processor to:

determine a target region containing an object from an original image, wherein the original image comprises a plurality of image blocks;

filter, for each image block, the image block according to a positional relationship between the image block and the target region to obtain a filtered image block, wherein at least two positional relationships exist between the plurality of image blocks and the target region, and different positional relationships correspond to different filtering strategies;

determine a filtered image according to a plurality of filtered image blocks obtained by filtering the plurality of image blocks by the different filtering strategies; and encode the filtered image according to the target region, wherein the encoding of the filtered image comprises:

division of the filtered image according to M division modes to obtain M levels of images, wherein the M levels of images contain encoding units having different granularities and different numbers in different levels, division granularities of the M division modes decrease sequentially, each encoding unit in an $i^{th}$-level image is divided into n sub-encoding units by an $(i+1)^{th}$ division mode, M is an integer greater than 1, i is an integer greater than 1 and less than or equal to M, and n is an integer greater than 1;

determination, in a division mode with the encoding unit as a granularity, of a rate distortion cost generated after encoding and reconstructing the encoding unit, as a first rate distortion cost;

determination, in a division mode with the sub-encoding unit as a granularity, of a sum of rate distortion costs generated by encoding and reconstructing n sub-encoding units respectively, as a second rate distortion cost;

determination of the division mode with the encoding unit as a granularity or the division mode with the sub-encoding unit as a granularity as a target division mode, according to a positional relationship between the encoding unit and the target region, the first rate distortion cost and the second rate distortion cost; and determination of an encoded image according to a target encoding unit in the target division mode.

11. The electronic device of claim 10, wherein the at least one processor is further configured to: for each image block, determine a filtering cost of the image block in each direction among N directions according to a pixel difference of the image block in each direction, where N is an integer greater than 1;

determine a main filtering direction and an auxiliary filtering direction according to the filtering cost; and filter the image block according to the main filtering direction, the auxiliary filtering direction and the positional relationship between the image block and the target region.

12. The electronic device of claim 11, wherein the at least one processor is further configured to:

determine a direction with a minimum filtering cost as the main filtering direction; and determine two directions which tilt at an angle of 45 degrees with respect to two sides of the main filtering direction as the auxiliary filtering direction.

13. The electronic device of claim 11, wherein the at least one processor is further configured to:

filter, in response to the image block belonging to the target region, the image block in the main filtering direction and the auxiliary filtering direction respectively; and determine, in response to the image block not belonging to the target region, an edge attribute of the image block, and filter the image block in the main filtering direction and the auxiliary filtering direction respectively according to the edge attribute.

14. The electronic device of claim 13, wherein the at least one processor is further configured to:

determine a direction perpendicular to the main filtering direction as a vertical filtering direction;

determine the edge attribute of the image block according to a filtering cost in the main filtering direction and a filtering cost in the vertical filtering direction; and filter, in response to the edge attribute of the image block being a strong edge region, the image block in the main filtering direction and the auxiliary filtering direction respectively.

15. The electronic device of claim 14, wherein the at least one processor is further configured to:

determine a ratio of the filtering cost in the main filtering direction to the filtering cost in the vertical filtering direction; and determine, in response to the ratio being greater than a threshold, the edge attribute of the image block being the strong edge region.

16. The electronic device of claim 13, wherein the at least one processor is further configured to:

perform a primary filtering on the image block in the main filtering direction to obtain a primary filtered image block; and perform a secondary filtering on the primary filtered image block in the auxiliary filtering direction to obtain the filtered image block.

17. The electronic device of claim 11, wherein the image block comprises at least one row of pixels in each direction; and the at least one processor is further configured to: for each direction, calculate an average value of pixels for each row in the direction, and determine a filtering cost of each row according to a difference between the average value and each pixel in the row; and determine the filtering cost of the image block in the direction according to respective filtering cost of each row of the at least one row of pixels.

18. A non-transitory computer readable storage medium storing computer instructions, wherein the computer instructions, when executed, are configured to cause a computer system to at least:

determine a target region containing an object from an original image, wherein the original image comprises a plurality of image blocks;

filter, for each image block, the image block according to a positional relationship between the image block and the target region to obtain a filtered image block, wherein at least two positional relationships exist between the plurality of image blocks and the target region, and different positional relationships correspond to different filtering strategies;

determine a filtered image according to a plurality of the filtered image blocks obtained by filtering the plurality of image blocks by the different filtering strategies;

divide the filtered image according to M division modes to obtain M levels of images, wherein the M levels of images contain encoding units having different granularities and different numbers in different levels, division granularities of the M division modes decrease sequentially, each encoding unit in an $i^{th}$-level image is divided into n sub-encoding units by an $(i+1)^{th}$ division mode, M is an integer greater than 1, i is an integer greater than 1 and less than or equal to M, and n is an integer greater than 1;

determine, in a division mode with the encoding unit as a granularity, a rate distortion cost generated after encoding and reconstructing the encoding unit, as a first rate distortion cost;

determine, in a division mode with the sub-encoding unit as a granularity, a sum of rate distortion costs generated by encoding and reconstructing n sub-encoding units respectively, as a second rate distortion cost;

determine the division mode with the encoding unit as a granularity or the division mode with the sub-encoding unit as a granularity as a target division mode, according to a positional relationship between the encoding unit and the target region, the first rate distortion cost and the second rate distortion cost; and determine an encoded image according to a target encoding unit in the target division mode.

19. The non-transitory computer readable storage medium of claim 18, wherein the instructions are further configured to cause the computer system to: for each image block, determine a filtering cost of the image block in each direction among N directions according to a pixel difference of the image block in each direction, where N is an integer greater than 1;

determine a main filtering direction and an auxiliary filtering direction according to the filtering cost; and filter the image block according to the main filtering direction, the auxiliary filtering direction and the positional relationship between the image block and the target region.

20. The non-transitory computer readable storage medium of claim 19, wherein the instructions are further configured to cause the computer system to:

determine a direction with a minimum filtering cost as the main filtering direction; and determine two directions which tilt at an angle of 45 degrees with respect to two sides of the main filtering direction as the auxiliary filtering direction.

* * * * *